United States Patent [19]

Harrison

[11] Patent Number: 4,941,553
[45] Date of Patent: Jul. 17, 1990

[54] VEHICLE BRAKING SYSTEM

[75] Inventor: Anthony W. Harrison, Birmingham, England

[73] Assignee: Lucas Industries, Birmingham, United Kingdom

[21] Appl. No.: 273,341

[22] Filed: Nov. 18, 1988

[30] Foreign Application Priority Data

Nov. 20, 1987 [GB] United Kingdom ............... 8727290
Jan. 19, 1988 [GB] United Kingdom ............... 8801089
Jan. 19, 1988 [GB] United Kingdom ............... 8801088

[51] Int. Cl.$^5$ ............................................. B60T 8/62
[52] U.S. Cl. ................................. 188/156; 303/114; 310/77; 318/614
[58] Field of Search ............... 188/156, 157, 162, 71.9; 303/91, 95, 113, 114; 310/49 R, 77; 318/362, 466, 614

[56] References Cited

U.S. PATENT DOCUMENTS

2,548,731  4/1951  Lehde ........................... 310/49 R
3,790,225  2/1974  Wehde ............................. 303/113

Primary Examiner—Duane A. Reger
Attorney, Agent, or Firm—Staas & Halsey

[57] ABSTRACT

A braking system for a vehicle has a stepper motor which controls the application of friction elements to a rotating part such as a brake drum. A control circuit controls the motor so that an output member is positioned by the motor in accordance with a variable demand signal. In one application, the control circuit receives a brake pressure signal from a transducer and controls the motor so as to compensate automatically for brake wear. In another application, the motor controls a debooster of an antilock brake system. The system also may include means for operating a parking brake.

12 Claims, 6 Drawing Sheets

VEHICLE BRAKING SYSTEM

This invention relates to a vehicle braking system.

It has been proposed in the past to make use of an electric motor to actuate a brake on an electrically driven rail vehicle. The motor was used to operate a mechanical jack which drove the friction parts of the brake into clamping contact with a rotating part of the vehicle.

Such systems are, however, too heavy and cumbersome, and are too slow to be used on road vehicles, where rapid brake response is a requirement and much higher deceleration rates are expected. Furthermore road vehicle brakes should be relatively jerk free which is difficult to achieve by means of the prior art motor driven braking systems.

In accordance with the invention there is provided a braking system which includes an electric motor for controlling the application of a friction element to a rotating part, characterised in that the motor has a rotor which is capable of being brought to rest at any one of a plurality of distinct positions and in that the motor is controlled by a control circuit which causes an output member driven by the motor to be positioned in accordance with a variable demand signal.

The motor will generally be a stepper motor having a rotor which is capable of being brought to rest at any one of a plurality of distinct step positions. The motor is preferably controlled by a drive circuit which causes the rotor to be turned to the next step position for each pulse received at an input of the drive circuit.

A particularly suitable type of stepper motor is the so-called switched reluctance stepper motor, which has a plurality of windings, the drive circuit operating to switch current in each of such windings in several different combinations. With such an arrangement, the motor may include a shaft position encoder which is used to enable the drive circuit to determine what combination of windings should be energised to enable the rotor to be turned to the next step position in either direction.

The benefit to be gained by the use of a stepper motor is that, provided certain limits concerning maximum frequency and maximum rate of change of frequency are observed, the control can operate open loop, although it is to be understood that the control circuit may include an adaptive loop for sensing the effect of brake application operations and adjusting the value of at least one parameter of the control circuit to optimise such effect. The control circuit may, indeed, receive signals from several different feedback signal generators sensing different variable conditions and adjust the values of several parameters accordingly.

By way of example, the control circuit may be arranged to provide automatic adjustment of a datum position of the friction elements to compensate automatically for wear thereof. To this end a transducer may be provided to measure the brake load, e.g. where braking forces are transmitted from an hydraulic drive cylinder driven by the stepper motor to one or more hydraulic brake-applying cylinders, the pressure developed in the driven cylinder will be indicative of the load. By sensing this pressure and resetting a position count held by the control circuit when the pressure is at a threshold value (or within a threshold range) such adjustment can be obtained.

The braking system may comprise an antilock braking system having a debooster as the output member, with the motor and control circuit arranged to deboost the braking system so as to reduce the risk of brake locking.

Switched reluctance motors are excellent for this purpose, since they can be operated open loop, that is without any position feedback, each pulse supplied to the drive circuit for the motor causing the rotor to turn through one precisely defined step. However, to hold the rotor in a specific position current must be continuously supplied to the windings and this is wasteful since the anti-skid system is called into use for only a small proportion of the time for which the vehicle is in use. The drive between the motor and the deboost device could, of course, be made non-reversible in a number of ways, but this would result in the mechanical efficiency of the device being reduced and may give rise to the need for complex constructions including wearing parts such as ratchets or friction brakes.

It is therefore preferable to provide an auxiliary magnetic circuit means, including permanent magnet means, a first part fixed with respect to a stator of the motor, and a second part fixed with respect to the rotor, the first and second parts being shaped and disposed such that there is a plurality of relative positions thereof at which the reluctance of the magnetic circuit is a minimum.

Of course, the auxiliary magnetic circuit means is not limited to use with a debooster but can be applied with advantage in many other circumstances, particularly when loss of motor power must result in a failsafe mode of operation or state.

The motor may be provided with a pair of toothed rings each having n teeth thereon or an exact multiple of n, the rings being attached respectively to the rotor and the stator of the motor in positions such that the teeth on the two rings are aligned whenever the rotor is in one of said n positions. One of the two rings may be permanently magnetised in a number of different ways to obtain the desired result.

If desired for any particular application, a pick-up winding may be incorporated in the ring which is attached to the motor stator, to act as a variable reluctance position or speed transducer.

The invention will be further described, by way of example, with reference to the accompanying drawings, in which.

Figure 1:
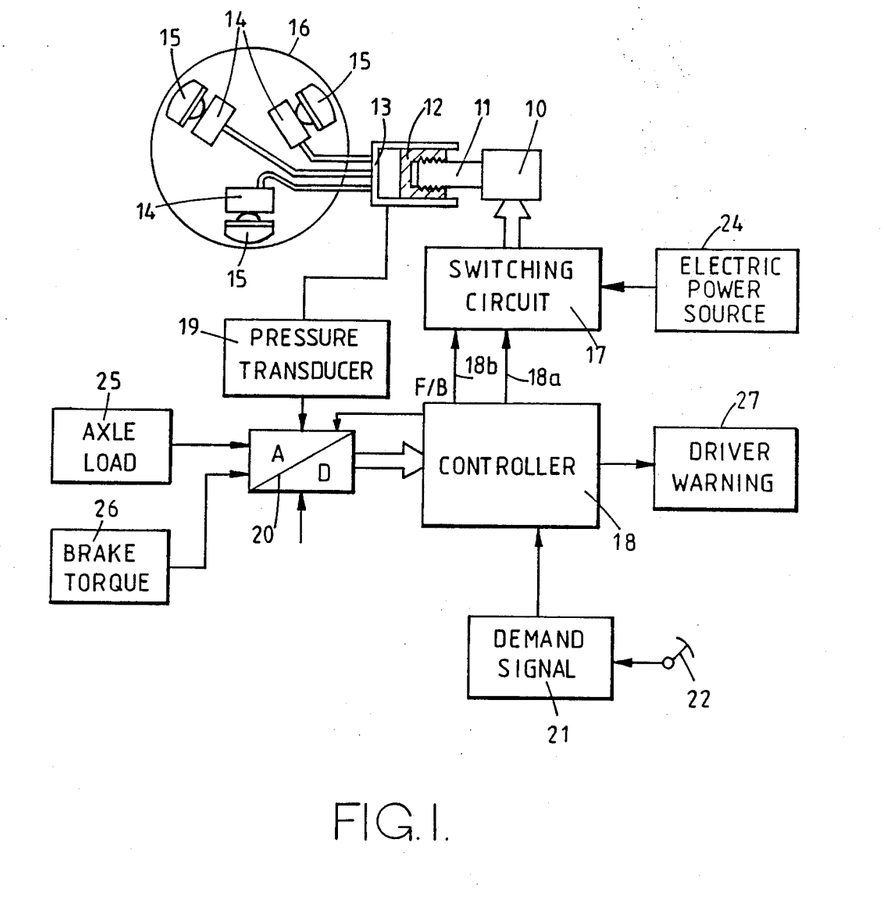
FIG. 1 is a diagrammatic representation of an example of a braking system constituting a first preferred embodiment of the invention.

Referring firstly to FIG. 1, the braking system shown includes a switched reluctance stepper motor 10 which is used to actuate the brakes of one wheel of a vehicle. The stepper motor 10 has an output member 11 which, through a ball-screw and nut arrangement, drives a piston 12 along a cylinder 13. This cylinder 13 is connected to several brake applying hydraulic cylinders 14 which can drive friction elements 15 into contact with the interior of a brake drum 16.

A power-switching circuit 17 is provided to control the direction of current flow in the various stator windings of the motor 10 under the control of signals from a microprocessor-based control circuit 18. The stepper motor rotor is moved through one step for each pulse produced at one output 18a in a direction determined by the signal at another output 18b. An electric power source 24, generally provided by the vehicle battery and charging system, is shown connected to the switching circuit 17.

A pressure transducer 19 is connected to sense the fluid pressure within the cylinder 13 and this provides a measure of the brake load at any given instant. This transducer is interfaced with the circuit 18 via a suitable analog-to-digital converter 20. Other variable conditions such as axle load, vehicle deceleration, wheel speeds, and drag on the friction elements, may also be sensed by suitable transducers and fed back to the control circuit 18 via the analog-to-digital converter. In FIG. 1, an axle load sensor 25 and a brake torque sensor 26 are shown connected in this way.

The control circuit 18 also receives a brake demand signal from a demand signal generator 21 operated by the brake pedal 22 of the vehicle.

The control circuit operates by positioning the rotor of the stepper motor in accordance with the demand signal from the demand signal generator. By supplying pulses to the switching circuit 17 at an appropriate frequency having regard to maximum load on the motor, the control circuit 18 ensures that no slip or stall of the motor 10 occurs thereby ensuring that the value of a position count held within the circuit 18 is always exactly representative of the actual position of the motor rotor.

Figure 3:
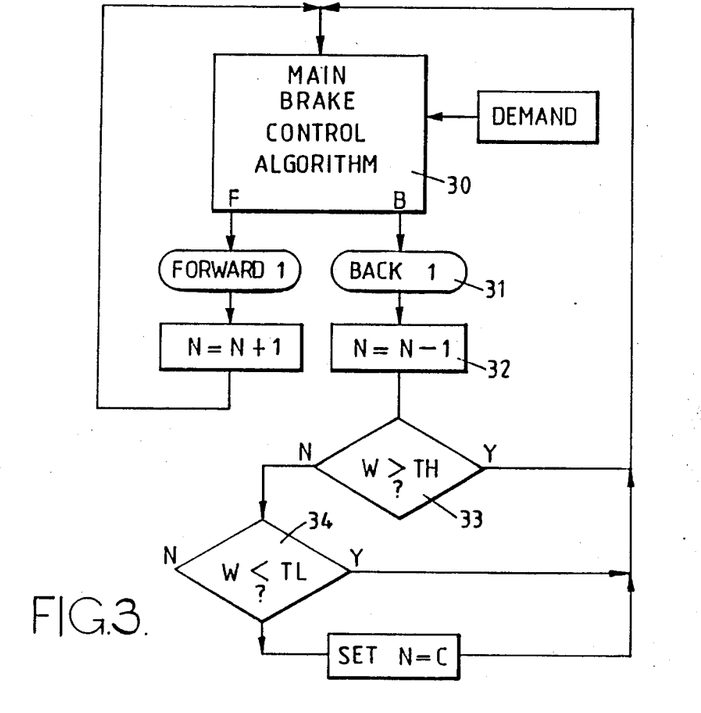
FIG. 3 is a flow chart showing a routine for automatic brake adjustment used in the program of a controller included in the embodiment of FIG. 1.

To adjust the system to allow for brake wear the control program includes the routine shown in FIG. 3.

The main brake control algorithm is shown in block 30 and this will not be described in detail herein During releasing movement of the brakes, however, after each "back" pulse is sent to the circuit 17 (at 31), the position counter N is decremented by one (32) and the value W held by the control circuit 18 and representing the most recently input value of the output of the transducer 19 is tested (33 and 34) to establish whether it is between two predetermined values $T_H$ and $T_L$. If it is, then the value of N is set to a datum value C, before the program returns to the main algorithm. Thereafter the algorithm 30 causes a fixed number of pulses to be supplied to back the brakes off by a fixed clearance distance.

Figure 2:
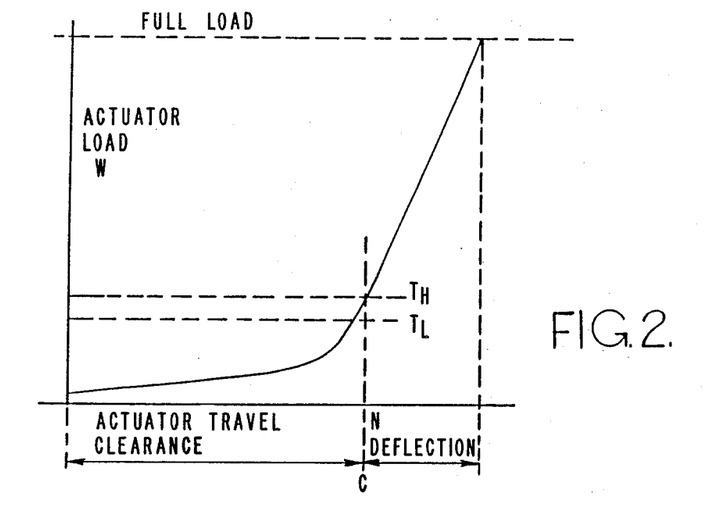
FIG. 2 is a graph showing a brake load curve, i.e. actuator load W plotted against brake actuator travel N.

As shown in FIG. 2, the values $T_H$ and $T_L$ represent load values just higher than a "knee" in the travel/load graph. This knee occurs during brake application, as the friction pads start to engage the drum, and its position in the travel/load characteristic varies as a function of wear of the brake friction material. Thus adjustment of the brakes to compensate for wear is made entirely within the operating program of the control circuit.

FIG. 1 shows a driver warning device 27, such as a warning light or alarm sounder, connected to the controller. This may be actuated by the controller 18 to warn the driver of a potentially dangerous state, for instance when the wear of the brake friction material is greater than a threshold value. In the case where the controller monitors the performance of the braking system, for instance by comparing the brake torque sensed by the sensor 26 with the hydraulic pressure sensed by the transducer 19, the device 27 may be actuated to warn the driver of brake fade, for instance during an alpine decent. This is particularly useful in a "brake-by-wire" system of the type shown in FIG. 1, in which the brake pedal 22 merely controls the demand signal generator 21 and provides no fade-dependent "feel" or physical feedback to the foot of the driver.

The system shown in FIG. 1 may also be used for a parking brake of a vehicle by supplying a further demand signal in response to operation of the parking brake. In this case, the system pressure is monitored by the transducer 19 so that any pressure variation, due to expansion or contraction of mechanical components, for example, or of the hydraulic fluid, can be corrected by the controller 18 operating the motor 10 through the required number of increments to restore the pressure to the required level. This enables a very sensitive response to be obtained which permits accurate control of the braking pressure during both dynamic and static braking, enabling a hydraulic system to be employed for parking purposes. However, for many applications, the system is only active when the parking brake is applied, and does not allow the motor 10 to turn thereafter. In order to provide failsafe operation, the system is deenergised when the vehicle is left unattended with the motor 10 unable to turn, so as to avoid the possibility that a system failure would cause the motor 10 to release the hydraulic pressure and thus the brakes.

Figure 4:
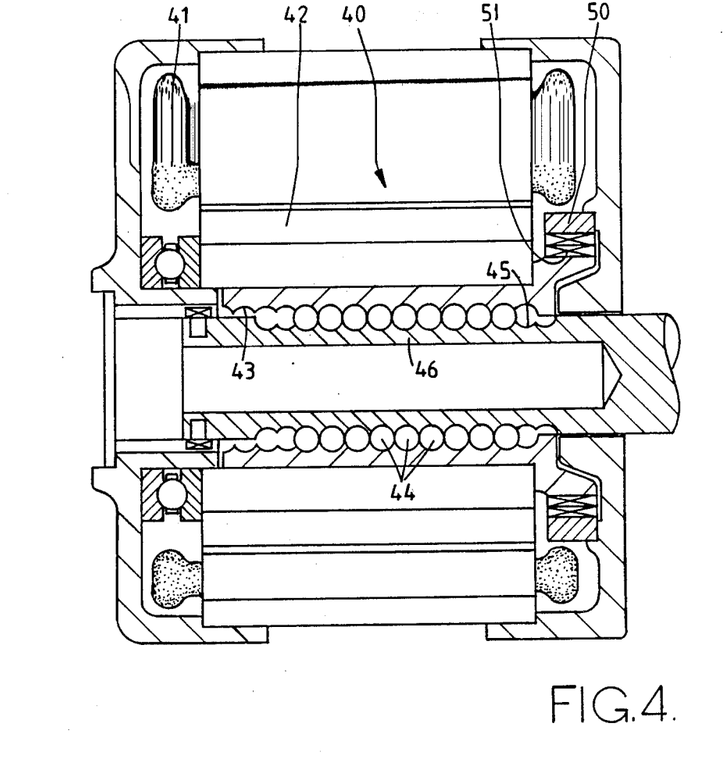
FIG. 4 is a longitudinal cross-section of an alternative type of stepper motor arrangement which may be used in the embodiment of FIG. 1.

FIG. 4 shows an alternative type of stepper motor arrangement which may be used in place of the motor 10 and the ball-screw and nut arrangement of FIG. 1 for driving the piston 12.

The stepper motor comprises a stator 40 with an associated winding 41 and a rotor 42 contained within the stator and mounted for rotation therein. The rotor has an internal thread 43 and balls 44 are interengaged between this thread and a corresponding thread 45 on a linearly displaceable plunger 46 contained within the rotor. The plunger moves the piston 12 to vary the volume within the cylinder 13.

The use of the stepper motor is beneficial since, provided certain load/speed restrictions are observed by the controller (not shown), the plunger positioning control can be run open loop (i.e. no plunger position transducer is required).

However since the preferred stepper motor does not include any permanent magnetic parts, and the drive connection between the rotor 42 and the plunger 46 is a reversible, low-friction connection, there is a risk of unwanted displacement of the plunger, for instance if the stepper motor holding current were to be interrupted. Means are therefore provided to provide holding torque even when the power is cut off.

Figure 5:
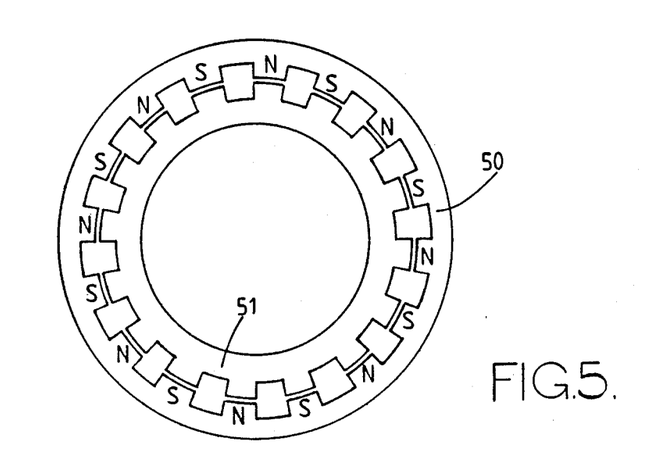
FIG. 5 is an elevation of a pair of magnetic detent rings included in the arrangement of FIG. 4.

This means comprises a pair of magnetic detent rings 50, 51 attached to the stator 40 and the rotor 42, respectively. As shown in FIG. 5, these rings have internal and external teeth respectively, and one of the rings (in this case the outer ring 50) is permanently magnetised such that alternate teeth are of opposite polarity. It will be understood by those skilled in the art that, with the arrangement described above, there will be a plurality of equi-angularly spaced positions of the inner ring 51 relative to the outer ring 50, at each of which the reluctance of the magnetic circuit constituted by the two rings is a minimum. The number of teeth on each ring is an exact multiple of the number of step positions of the stepper motor and the rings 50, 51 are mounted so that the minimum reluctance positions coincide with the step positions.

With the arrangement thus described, holding torque is provided by the magnetic detent means in each step position of the rotor 42 to prevent the rotor from turning in the absence of a correct power pulse. The torque characteristic of the stepper motor is, of course, altered by the effect of the magnetic detent means. However, the energy used to move the inner ring 51 out of each minimum reluctance position is largely recovered on arrival at the next such position. The holding torque is insignificant when the rotor is actually in rotation.

Figure 6:
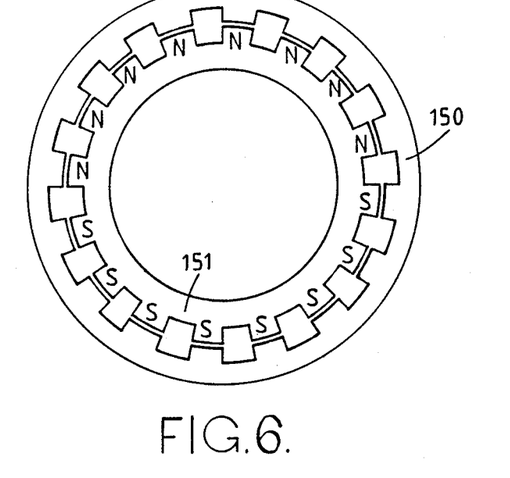
FIG. 6 is an elevation of an alternative pair of magnetic detent rings.

An alternative magnetisation of the rings 150, 151 is shown in FIG. 6. Here, it is the inner ring 151 which is magnetised and magnetisation has been carried out in a manner to make all the teeth on one side of a diametral plane north poles and all those on the other side south poles.

Figure 7:
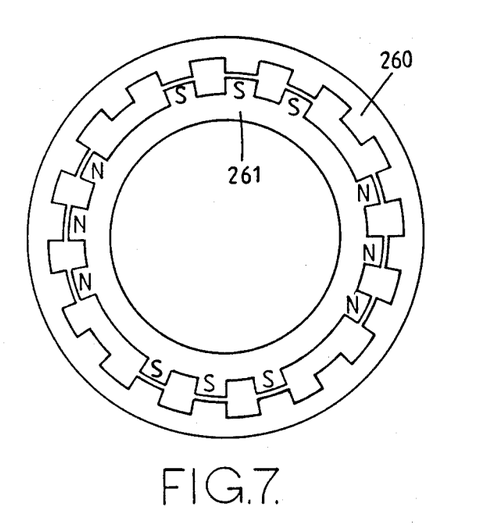
FIG. 7 is an elevation of a further alternative pair of magnetic detent rings.

In the arrangement of the rings 260, 261 shown in FIG. 7, the teeth of the inner ring 261 are divided into a plurality of groups (in the case shown four groups of three teeth) separated by a missing tooth. Alternate groups of teeth are of opposite polarity. This arrangement suffers from less magnetic leakage than the FIG. 5 arrangement, but suffers lower flux in the rings than that shown in FIG. 6, where the flux in the portions of the outer ring in the neighbourhood of the changeover in polarity of the poles is higher than the flux elsewhere.

Figure 8:
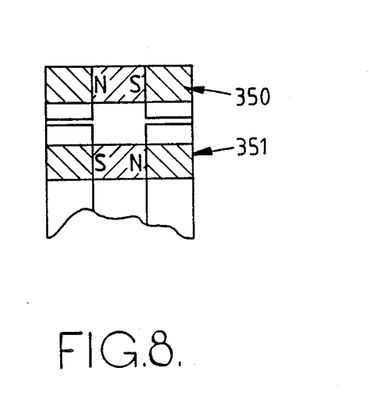
FIG. 8 is a fragmentary sectional view showing yet another alternative pair of magnetic detent rings.

The arrangement shown in FIG. 8 uses composite rings 350, 351. Each ring consists of an annular permanent magnet polarised axially and a pair of toothed soft iron rings sandwiching the permanent magnet ring between them. As shown, the permanent magnets in the two rings are effectively in "series" in the magnetic circuit formed by the rings.

Figure 9:
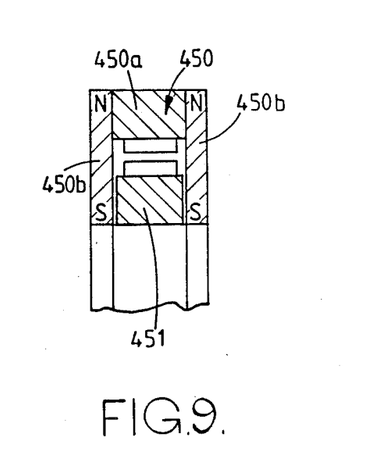
FIG. 9 is a fragmentary sectional view showing a still further alternative pair of magnetic detent rings.

Turning now to FIG. 9, the outer ring 450 includes a toothed soft iron ring 450a sandwiched between two identical radially magnetised annular permanent magnets 450b. The inner ring 451 is a toothed soft iron ring which lies between the two permanent magnets. The magnets in this case are effectively in parallel in the magnetic circuit.

In any of the above described constructions, a pick-up winding (not shown) may be incorporated in the magnetic circuit in such a manner as to have electrical signals induced in it by the changes in flux in the magnetic circuit during rotation. The winding would be connected to a suitable buffer circuit of known form for converting the induced signals into a pulse train, the frequency of which is proportional to the speed of rotation of the rotor.

Figure 10:
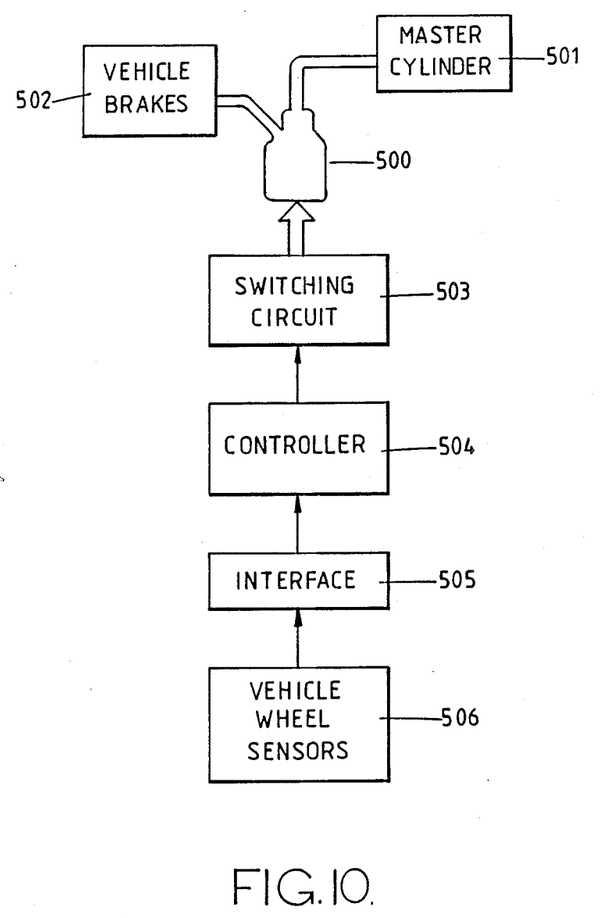
FIG. 10 is a schematic diagram of an antilock braking system constituting a second preferred embodiment of the invention.

FIG. 10 shows a vehicle antilock braking system in which a debooster 500 is provided in an hydraulic brake actuation system between a master cylinder 501 and vehicle brakes 502. The debooster 500 will be described in detail hereinafter with reference to FIG. 11, but includes a stepper motor connected to the output of a switching circuit 503 which is controlled by a controller 504. The controller has an input which receives signals via an interface 505 from wheel sensors 506 which monitor the rotational speed of each vehicle wheel.

The controller 504 is preferably based on a microprocessor system controlled by software. The antilock braking system operates, for instance, by reducing by means of the debooster 500 the hydraulic pressure to the brakes 502 when the controller 504 determines, from the wheel speed measurements performed by the sensors 506, that one of the wheels is decelerating too quickly for proper rolling contact with the ground to be maintained. The controller 504 then causes the debooster 500 to restore the hydraulic pressure until wheel deceleration is again determined to be too quick, the process being rapidly repeated as necessary. Further details of the arrangement and operation of the antilock braking system are not necessary for a full description and understanding of embodiment of FIG. 10. Although FIG. 10 illustrates the system in isolation, it may be embodied as part of a complete vehicle braking system, such as an adaptive brake-by-wire system, for instance in conjunction with the embodiment of FIG. 1.

Figure 11:
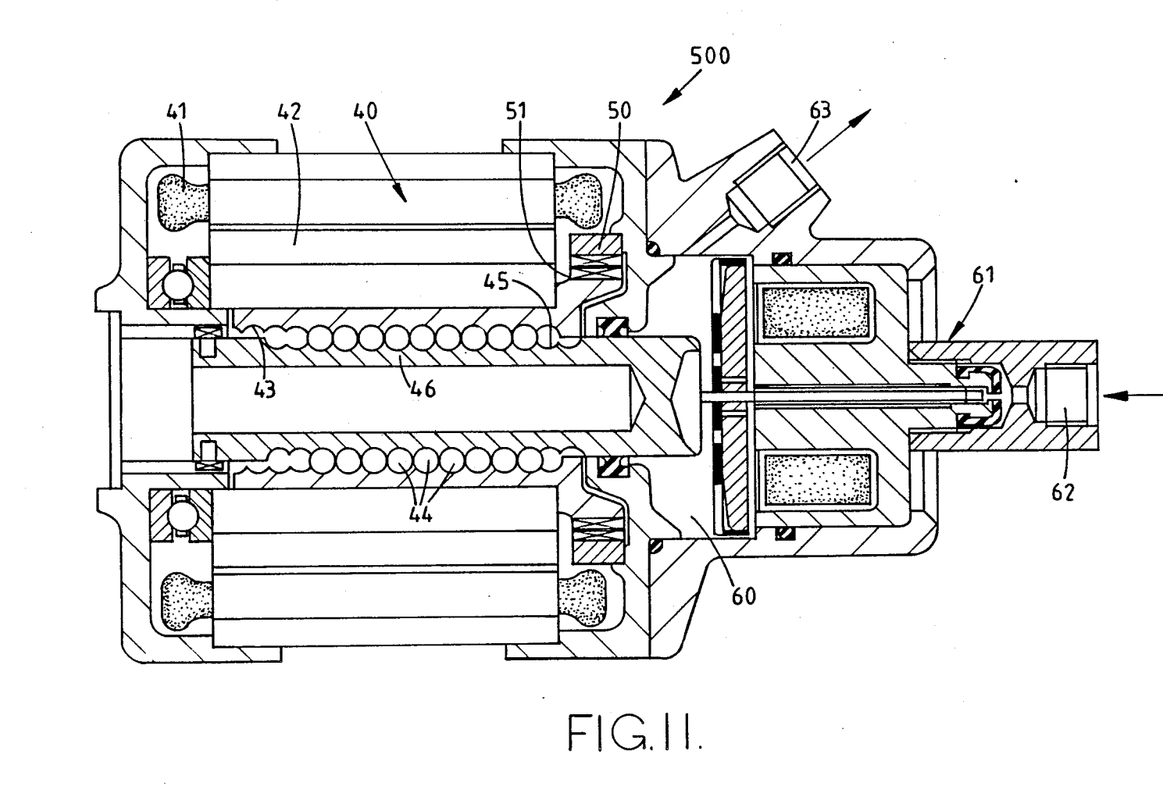
FIG. 11 is a longitudinal cross-section of a debooster for use in the embodiment of FIG. 10.

As shown in FIG. 11, the debooster 500 includes a stepper motor with a stator 40 and associated winding 41 and a rotor 42, cooperating threads 43, 45 and balls 44, plunger 46, and magnetic detent rings 50, 51. The construction and arrangement of these parts is the same as the corresponding parts in FIG. 4 and will not be described further.

The debooster has connections 62 and 63 for connection to hydraulic lines leading to the master cylinder 501 and to slave cylinders of the vehicle brakes 502, respectively. The purpose of the plunger 46 is to vary the volume of a chamber 60 within the body of the actuator and the plunger operates in conjunction with a solenoid valve 61.

For rapidly releasing the brakes on detection of excessive wheel deceleration, the solenoid valve is closed and the plunger 46 is rapidly displaced to the left as viewed in FIG. 11 to increase the volume of the chamber 60 and thereby relieve the brake pressure. Subsequently the brakes are re-applied by displacing the plunger 46 to the right before releasing the solenoid valve.

The use of the stepper motor for this application is beneficial since, provided certain load/speed restrictions are observed by the controller, the plunger positioning control can be run open loop (i.e. no plunger position transducer is required).

However since the preferred stepper motor does not include any permanent magnetic parts, and the drive connection between the rotor and the plunger is a reversible, low-friction connection, pressure in the chamber 60 could cause unwanted displacement of the plunger 46 if the stepper motor holding current were to be interrupted. The pair of magnetic detent rings 50, 51 attached to the stator and the rotor, respectively, are provided so as to provide holding torque even when power is cut off. These rings may have any of the forms illustrated in FIGS. 5 to 9.

I claim:

1. A braking system comprising a rotating part, a friction element for cooperating with said rotating part to provide braking, a motor having an output member for controlling said friction element, and a control circuit for receiving a variable demand signal, said motor comprising a stator and a rotor which is arranged to be brought to rest at any one of a plurality of distinct positions, said control circuit controlling said motor so as to drive said output member to a position in accordance with the variable demand signal and to provide automatic adjustment of a datum position of said friction element to compensate automatically for wear thereof.

2. A braking system as claimed in claim 1, in which said control circuit includes a drive circuit having an input, said drive circuit driving said motor to cause said rotor to be turned to a next one of the plurality of distinct positions in response to each pulse received at said input of said drive circuit.

3. A braking system as claimed in claim 2, in which said motor is a switched reluctance stepper motor having a plurality of windings and said drive circuit is arranged to switch current in each of said plurality of windings in a plurality of predetermined different combinations.

4. A braking system as claimed in claim 1, further comprising auxiliary magnetic circuit means including permanent magnet means, a first part fixed with respect to said stator, and a second part fixed with respect to said rotor, said first and second parts being shaped and disposed such that there is a plurality of relative positions thereof at which the reluctance of said auxiliary magnetic circuit means is a minimum.

5. A braking system as claimed in claim 4, in which said motor has n distinct positions and said first and second parts comprise first and second toothed rings at least one of which has x, n teeth, where x is a positive non-zero integer, said first and second rings being arranged such that said teeth thereof are aligned whenever said rotor is in any one of the n distinct positions.

6. A braking system as claimed in claim 5, in which at least one of said first and second rings is permanently magnetised to provide said permanent magnet means.

7. A braking system as claimed in claim 6, in which said teeth of said at least one of said first and second rings alternate circumferentially in magnetic polarity.

8. A braking system as claimed in claim 6, in which said teeth of said at least one of said first and second rings form a plurality of groups of adjacent teeth, said groups alternating circumferentially in magnetic polarity.

9. A braking system as claimed in claim 5, in which each of at least one of said first and second rings comprises a plurality of toothed soft iron rings, each adjacent pair of said rings being axially separated by an annular axially polarised permanent magnet providing said permanent magnet means.

10. A braking system as claimed in claim 5, in which said permanent magnet means comprises at least one annular radially polarised permanent magnet.

11. A braking system as claimed in claim 1, further comprising a transducer arranged to measure brake load, said control circuit holding a position count and resetting the position count when the brake load measured by said transducer is within a threshold range.

12. A braking system as claimed in claim 11, further comprising a hydraulic actuator for actuating said friction element, said transducer comprising an hydraulic pressure transducer for measuring hydraulic pressure in said hydraulic actuator.

* * * * *